United States Patent
Ito et al.

(10) Patent No.: US 12,205,122 B2
(45) Date of Patent: Jan. 21, 2025

(54) CUSTOMER SERVICE SYSTEM, SERVER, CONTROL METHOD, AND STORAGE MEDIUM

(71) Applicant: HONDA MOTOR CO., LTD., Tokyo (JP)

(72) Inventors: Leo Ito, Tokyo (JP); Jingwen Han, Tokyo (JP); Tomohiro Tsukamoto, Wako (JP); Eriko Okabe, Wako (JP); Yuichi Kawasaki, Wako (JP); Misato Fukushima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 17/673,165

(22) Filed: Feb. 16, 2022

(65) Prior Publication Data
US 2022/0300982 A1 Sep. 22, 2022

(30) Foreign Application Priority Data
Mar. 16, 2021 (JP) .................. 2021-042707

(51) Int. Cl.
G06Q 30/01 (2023.01)
G06Q 10/02 (2012.01)
G10L 15/22 (2006.01)

(52) U.S. Cl.
CPC ............ *G06Q 30/01* (2013.01); *G06Q 10/02* (2013.01); *G10L 15/22* (2013.01); *G10L 2015/227* (2013.01); *G10L 2015/228* (2013.01)

(58) Field of Classification Search
None
See application file for complete search history.

(56) References Cited

U.S. PATENT DOCUMENTS

| 9,796,093 B2 | 10/2017 | Mascorro Medina et al. |
| 10,311,400 B2 | 6/2019 | Mascorro Medina et al. |
| 10,373,116 B2 | 8/2019 | Medina et al. |
| (Continued) | | |

FOREIGN PATENT DOCUMENTS

| JP | 2004-299026 A | 10/2004 |
| JP | 2011-221683 A | 11/2011 |
| (Continued) | | |

OTHER PUBLICATIONS

T. Kanda et al., "A Communication Robot in a Shopping Mall," in IEEE Transactions on Robotics, vol. 26, No. 5, pp. 897-913, Oct. 2010, doi: 10.1109/TRO.2010.2062550. (Year: 2010).*

(Continued)

*Primary Examiner* — Vincent M Cao
(74) *Attorney, Agent, or Firm* — WHDA, LLP

(57) ABSTRACT

A customer service system for providing customer service using a robot for customer service is provided. A first acquisition unit acquires first information regarding a topic provided by a person in charge of response in a negotiation between a visitor and the person in charge of response. A second acquisition unit acquires a detection result regarding speech and behavior of the visitor by the robot. An estimation unit estimates a reaction of the visitor on a basis of the detection result acquired by the second acquisition unit. An output unit outputs second information regarding the reaction estimated by the estimation unit.

8 Claims, 10 Drawing Sheets

(56) References Cited

U.S. PATENT DOCUMENTS

| | | | |
|---|---|---|---|
| 10,757,256 B1* | 8/2020 | Brown | G06N 5/045 |
| 10,984,034 B1* | 4/2021 | Sandland | G10L 15/183 |
| 2005/0222712 A1* | 10/2005 | Orita | G06Q 30/02 |
| | | | 704/E15.045 |
| 2015/0242707 A1* | 8/2015 | Wilf | G06F 18/2413 |
| | | | 382/159 |
| 2016/0114488 A1 | 4/2016 | Mascorro Medina et al. | |
| 2016/0132949 A1* | 5/2016 | Adoni | G06Q 30/0613 |
| | | | 705/26.41 |
| 2017/0011745 A1* | 1/2017 | Navaratnam | G06Q 30/02 |
| 2017/0286916 A1* | 10/2017 | Skiba | H04L 67/025 |
| 2018/0040046 A1 | 2/2018 | Gotoh et al. | |
| 2018/0043542 A1 | 2/2018 | Mascorro Medina et al. | |
| 2018/0068177 A1 | 3/2018 | Sakai et al. | |
| 2018/0068321 A1 | 3/2018 | Maeda et al. | |
| 2018/0075403 A1 | 3/2018 | Mascorro Medina et al. | |
| 2018/0096271 A1* | 4/2018 | Raanani | G06N 20/00 |
| 2019/0087772 A1 | 3/2019 | Medina et al. | |
| 2019/0163985 A1* | 5/2019 | Wang | G06Q 30/00 |
| 2019/0202060 A1* | 7/2019 | Aaron | H04R 1/028 |
| 2019/0325379 A1 | 10/2019 | Medina et al. | |
| 2019/0370738 A1 | 12/2019 | Medina et al. | |
| 2020/0099790 A1* | 3/2020 | Ma | G06N 3/08 |
| 2020/0176018 A1* | 6/2020 | Feinauer | G10L 25/63 |
| 2020/0412875 A1* | 12/2020 | Brooks | G06Q 30/01 |
| 2021/0166280 A1* | 6/2021 | Koo | H04W 4/021 |

FOREIGN PATENT DOCUMENTS

| | | |
|---|---|---|
| JP | 2011-221891 A | 11/2011 |
| JP | 2016-200851 A | 12/2016 |
| JP | 6142306 B2 | 6/2017 |
| JP | 2018-041230 A | 3/2018 |
| JP | 2018-041231 A | 3/2018 |
| JP | 2020-502649 A | 1/2020 |
| JP | 2020-184216 A | 11/2020 |
| JP | 2021-018482 A | 2/2021 |

OTHER PUBLICATIONS

Office Action dated Sep. 17, 2024, issued in counterpart JP application No. 2021-042707, with English translation. (6 pages).

* cited by examiner

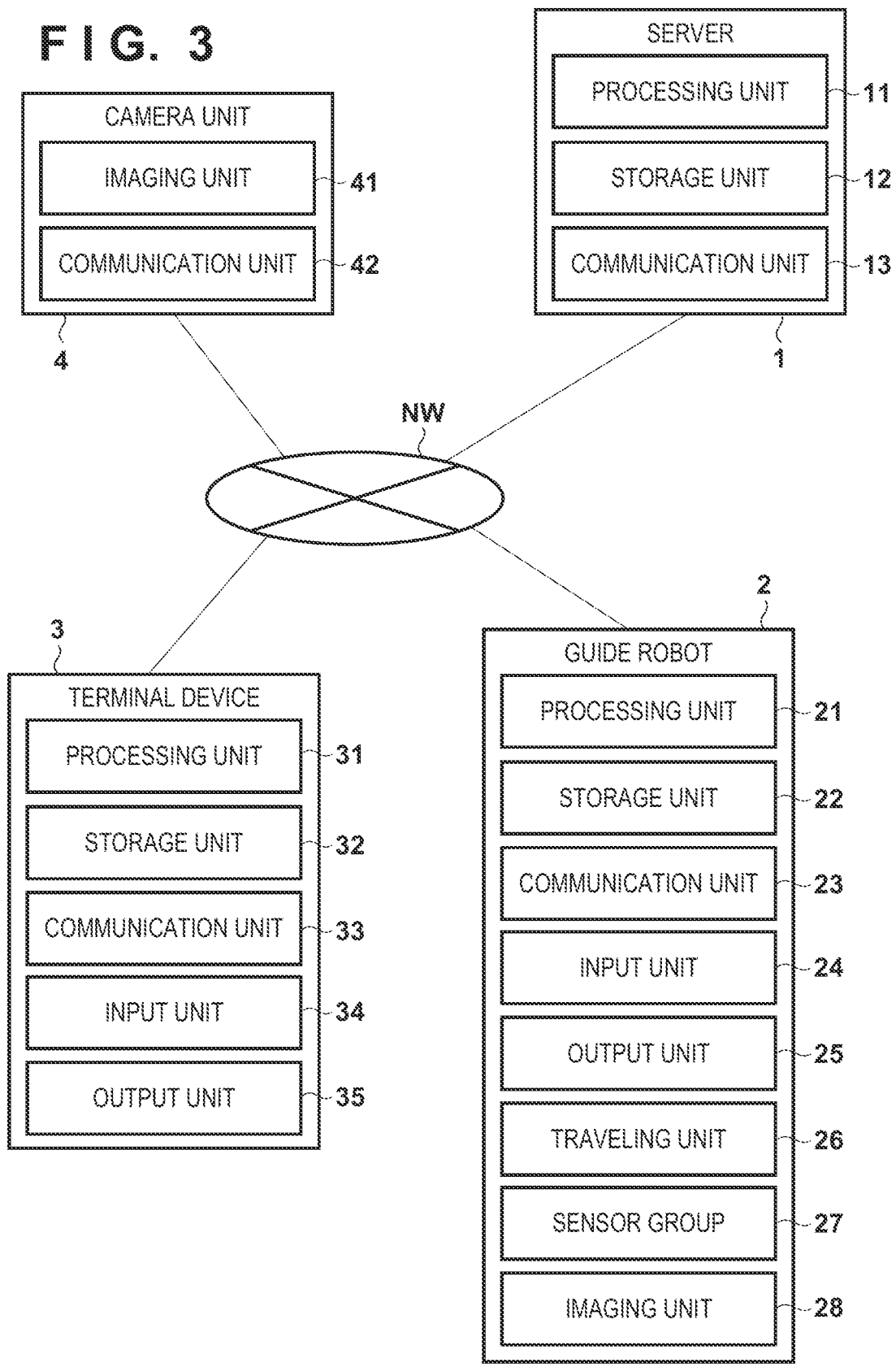

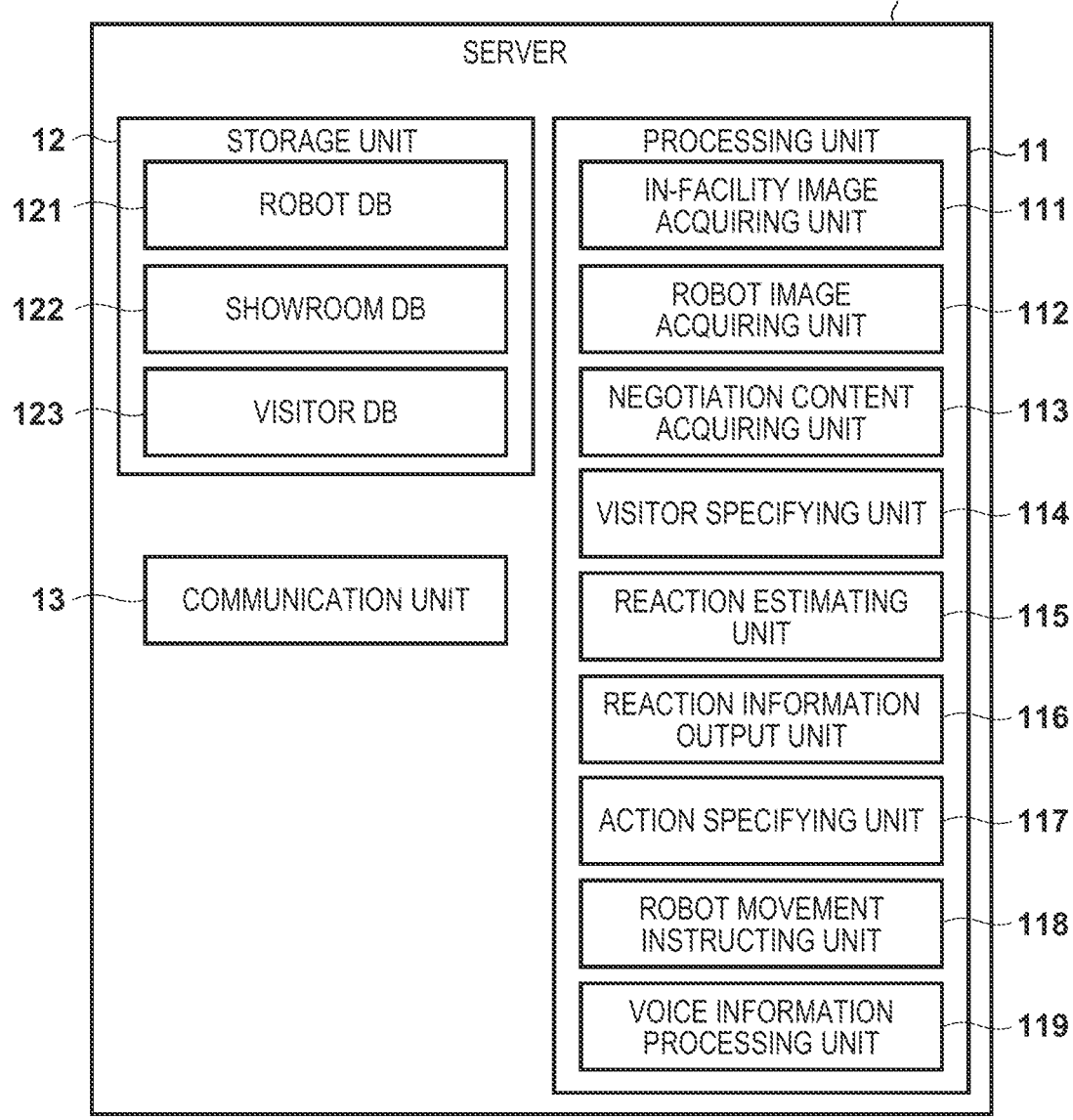

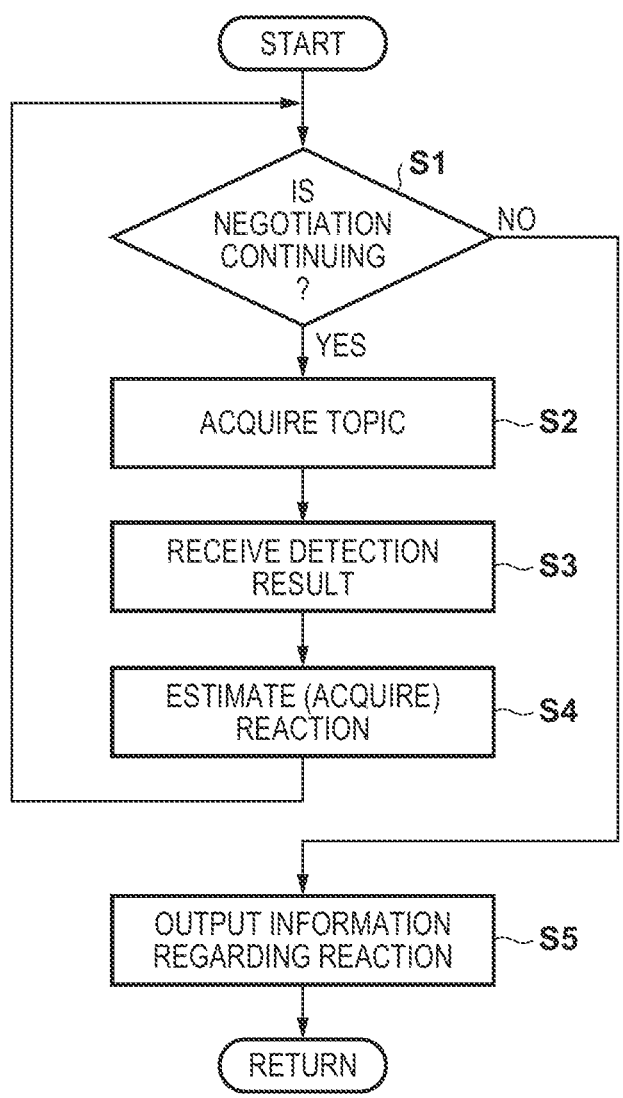

FIG. 6A

| ID | VISITOR | TIME | TOPIC |
|---|---|---|---|
| 001 | XXXX | 13:00 | INTRODUCTION OF NEW CAR A |
| 002 | XXXX | 13:15 | INTRODUCTION OF NEW CAR B |
| ... | XXXX | ... | ... |

FIG. 6B

| ID | VISITOR | TIME | REACTION |
|---|---|---|---|
| 101 | XXXX | 13:02 | NEUTRAL |
| 102 | XXXX | 13:07 | NEGATIVE |
| 103 | XXXX | 13:11 | POSITIVE |
| 104 | XXXX | 13:20 | NEUTRAL |
| 105 | XXXX | 13:23 | POSITIVE |
| ... | XXXX | ... | ... |

FIG. 6C

| ID | VISITOR | TIME | TOPIC | REACTION |
|---|---|---|---|---|
| 201 | XXXX | 13:00 | INTRODUCTION OF NEW CAR A | NEUTRAL |
| 202 | XXXX | 13:15 | INTRODUCTION OF NEW CAR B | POSITIVE |
| ... | XXXX | ... | ... | ... |

FIG. 8

○ NEGOTIATION RECORD xx YEAR xx MONTH xx DAY xx O'CLOCK
CUSTOMER NAME : xxxxxx
NAME OF PERSON IN CHARGE : xxxxxx

○ REACTION OF CUSTOMER

| TOPIC | REACTION |
|---|---|
| INTRODUCTION OF NEW CAR A | NEUTRAL |
| INTRODUCTION OF NEW CAR B | POSITIVE |

○ COMMENT

SEEMS TO BE INTERESTED IN NEW CAR B.
PLEASE PASS PAMPHLET AND ESTIMATION SHEET TO CUSTOMER.

35a

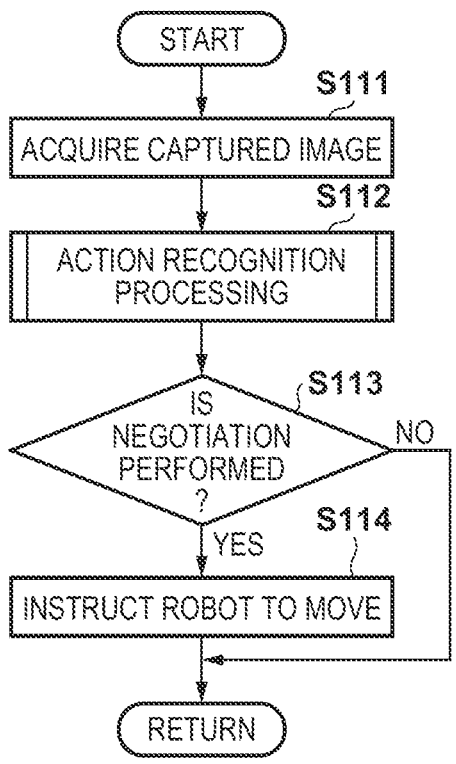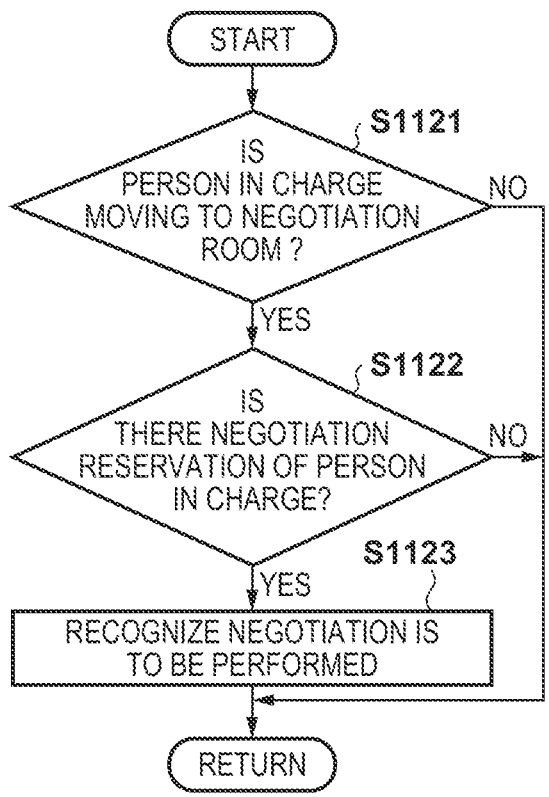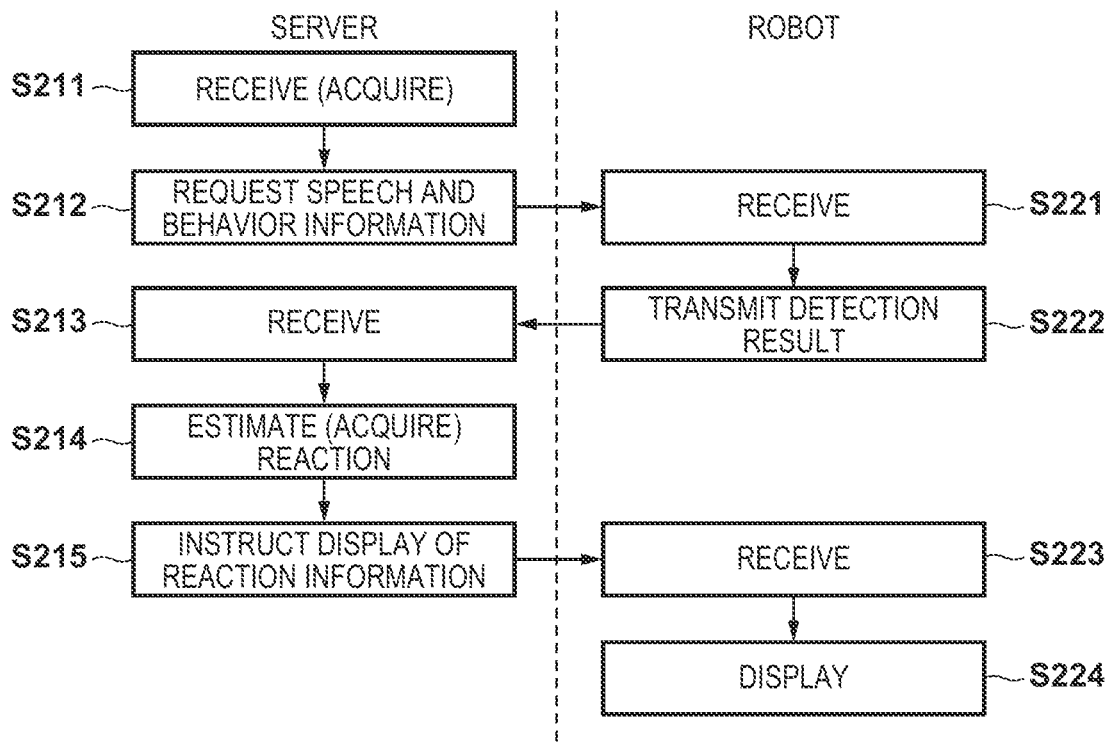

CUSTOMER SERVICE SYSTEM, SERVER, CONTROL METHOD, AND STORAGE MEDIUM

CROSS-REFERENCE TO RELATED APPLICATION(S)

This application claims priority to and the benefit of Japanese Patent Application No. 2021-042707 filed on Mar. 16, 2021, the entire disclosure of which is incorporated herein by reference.

BACKGROUND OF THE INVENTION

Field of the Invention

The present invention relates to a customer service system, a server, a control method, and a storage medium.

Description of the Related Art

Recently, various techniques related to a customer service system using a robot for customer service have been proposed as one of means for solving a shortage of manpower. For example, in Japanese Patent No. 6142306, for example, a robot explains an exhibit to a visitor and guides the visitor to an exhibition hall.

SUMMARY OF THE INVENTION

According to one embodiment of the present invention, a customer service system for providing customer service using a robot for customer service, comprises: a first acquisition unit configured to acquire first information regarding a topic provided by a person in charge of response in a negotiation between a visitor and the person in charge of response; a second acquisition unit configured to acquire a detection result regarding speech and behavior of the visitor by the robot; an estimation unit configured to estimate a reaction of the visitor on a basis of the detection result acquired by the second acquisition unit; and an output unit configured to output second information regarding the reaction estimated by the estimation unit.

According to another embodiment of the present invention, a server functions as each unit of the customer service system according the above embodiment.

According to still another embodiment of the present invention, a control method of a customer service system for providing customer service using a robot for customer service, comprises: acquiring first information regarding a topic provided by a person in charge of response in a negotiation between a visitor and the person in charge of response; acquiring a detection result regarding speech and behavior of the visitor by the robot; estimating a reaction of the visitor on a basis of the detection result acquired in the acquiring the detection result; and outputting second information regarding the reaction estimated in the estimating.

According to still yet another embodiment of the present invention, a non-transitory storage medium stores a program causing a computer to execute a customer service method, the method comprising: acquiring first information regarding a topic provided by a person in charge of response in a negotiation between a visitor and the person in charge of response; acquiring a detection result regarding speech and behavior of the visitor by the robot; estimating a reaction of the visitor on a basis of the detection result acquired in the acquiring the detection result; and outputting second information regarding the reaction estimated in the estimating.

BRIEF DESCRIPTION OF THE DRAWINGS

FIG. 3 is a block diagram illustrating a hardware configuration of a customer service system;

FIG. 4 is a block diagram illustrating functions implemented by a management server;

FIG. 5 is a flowchart illustrating a processing example of a processing unit of a management server;

FIG. 6A is a diagram illustrating information acquired by a negotiation content acquiring unit;

FIG. 6B is a diagram illustrating information acquired by a reaction estimating unit;

FIG. 6C is a diagram illustrating information output from a reaction information output unit to a visitor DB;

FIG. 8 is a diagram illustrating a screen example displayed on a display unit as an output unit of a terminal device;

FIG. 9A is a flowchart illustrating a processing example of a processing unit of a management server;

FIG. 9B is a flowchart illustrating a processing example of a processing unit of a management server;

FIG. 10 is a flowchart illustrating processing examples of a processing unit of a management server and a processing unit of a robot;

DESCRIPTION OF THE EMBODIMENTS

Figure 1:
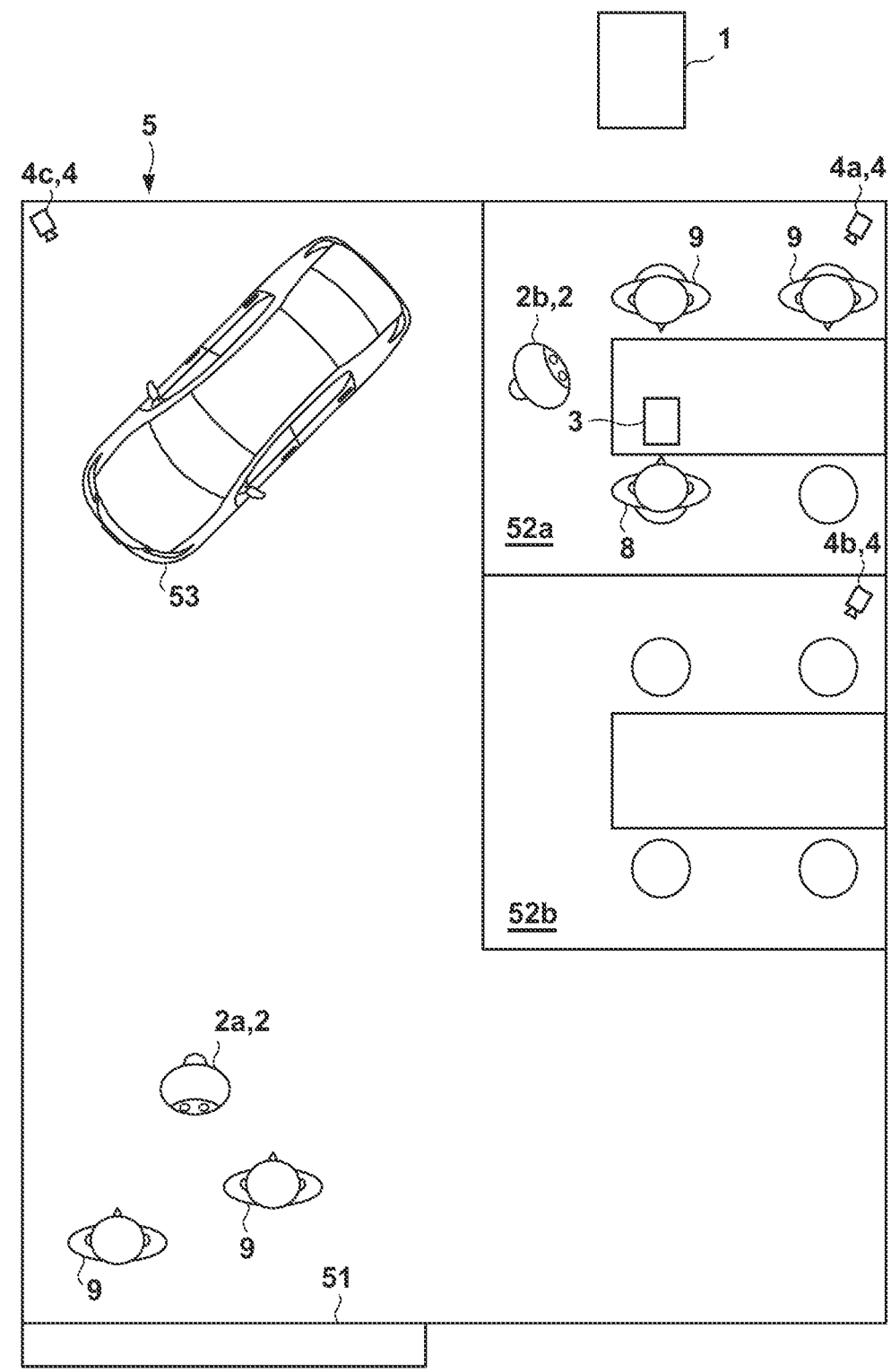
FIG. 1 is a diagram illustrating an outline of a customer service system.

By the way, when a visitor to a facility and a person in charge of response to the visitor perform a negotiation, the person in charge of response may miss a speech of the visitor or cannot be able to read an emotion of the visitor in some cases. As a result, an appropriate proposal cannot be made to the visitor in some cases.

An embodiment of the present invention provides a technique capable of providing appropriate customer service according to a reaction of a visitor.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

<Outline of Customer Service System SY>

FIG. 1 is a diagram illustrating an outline of a customer service system SY. The customer service system SY is a system for providing customer service using a robot 2. FIG. 1 illustrates an example in a case where the customer service system SY is used in a showroom 5 of an automobile dealer. The customer service system SY includes a management server 1, the robot 2, a terminal device 3, and a camera unit 4.

The management server 1 is a server that manages information regarding a store where the showroom 5 is disposed or information regarding a visitor to the store, and controls the robot 2, the terminal device 3, and the camera unit 4. The management server 1 is installed, for example, in an office or the like of each store. Note that the management server 1 installed in each store may be communicable with a host server that accepts a reservation of a visitor and manages personal information via a network such as the Internet.

The robot 2 is a robot for providing customer service in the showroom 5. FIG. 1 illustrates a robot 2a that performs reception near an entrance 51 of the showroom 5 and a robot 2b that is attending a negotiation between a person in charge of response 8 and a visitor 9 in a negotiation space 52a. In the following description, when these robots 2a and 2b are not distinguished from each other, they are referred to as the robot 2.

The terminal device 3 is a terminal operated by the person in charge of response 8. The person in charge of response 8 presents various materials to the visitor 9 using the terminal device 3 and confirms information of the visitor 9 and the like. The camera unit 4 is a unit that images the showroom 5. In FIG. 1, a camera unit 4a and a camera unit 4b that image negotiation spaces 52a and 52b, respectively, and a camera unit 4c that images the entire showroom 5 are disposed. In the following description, when the negotiation spaces 52a and 52b are not distinguished from each other, they are referred to as the negotiation space 52, and when the camera units 4a to 4c are not distinguished from each other, they are referred to as the camera unit 4.

<Configuration of Robot 2>

Figure 2:
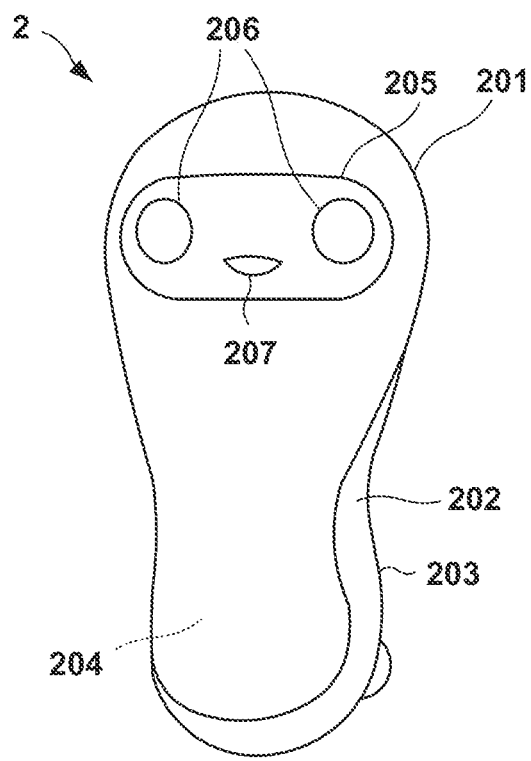
FIG. 2 is a schematic diagram illustrating a configuration of a robot.

FIG. 2 is a schematic diagram illustrating a configuration of the robot 2. The robot 2 is formed in an upright substantially gourd shape, and roughly includes a head portion 201, a constricted portion 202, and a body portion 203. In the present embodiment, the robot 2 has a height of about 110 cm. In addition, the robot 2 has no limbs, and is configured to be movable in any direction by 360 degrees such as front, rear, left, right, and oblique directions by a traveling device 204 disposed at a lower end of the body portion 203. Note that description of a specific configuration of the traveling device 204 will be omitted.

As described above, since the robot 2 has a shape in which the head portion 201 is slightly larger than the body portion 303 and there is no limb, for example, the robot 2 allows a child to easily hold the robot 2 and easily communicate with the child. In addition, since the robot 2 can move while the traveling device 204 is shaking in a front-and-rear direction and a left-and-right direction, for example, the robot 2 can move such that the visitor 9 easily notices approach and the like of the robot 2, and the robot 2 easily communicates with the visitor 9.

The head portion 201 of the robot 2 has a substantially elliptical face portion 205 that is long in the horizontal direction, and the face portion 205 is configured to be able to display an expression of the robot 2, a simple character image, and the like. In the present embodiment, a pair of pseudo eyes 206 expressing the eyes is displayed on the face portion 205 of the robot 2, and various expressions can be expressed by the pair of pseudo eyes 206 (see FIGS. 11A to 11C). For example, by changing the shape of the pair of pseudo eyes 206, expressions such as delight, anger, sorrow, and pleasure can be expressed. In the present embodiment, a pseudo mouth 207 expressing the mouth is further displayed. By changing the shape of the pseudo mouth 207 in addition to the pair of pseudo eyes 206, a change in expression can be easily understood.

In addition, the robot 2 is configured to be able to move the position of the pair of pseudo eyes 206 in the face portion 205. The robot 2 expresses a movement of moving the line of sight by changing the position of the pair of pseudo eyes 206 in the face portion 205. The robot 2 guides the line of sight of the visitor 9 by expressing a movement of moving the line of sight by changing the position of the pair of pseudo eyes 206 in front of the visitor 9. At this time, by causing the robot 2 to perform a rotational movement or the like in conjunction with the movement of the line of sight, it is easier to guide the line of sight of the visitor 9.

Note that the mode of the robot 2 is an example, and a robot according to another mode can also be adopted. For example, the shape and the like of the robot 2 may be appropriately changed. In addition, the robot may be a stationary robot. For example, stationary robots may be disposed near the entrance 51 of the showroom 5 and in the negotiation spaces 52a and 52b, respectively.

<Hardware Configuration>

FIG. 3 is a block diagram illustrating a hardware configuration of the customer service system SY. The management server 1, the robot 2, the terminal device 3, and the camera unit 4 are configured to be communicable with each other via a network NW such as a wireless local area network (LAN).

The server 1 includes a processing unit 11, a storage unit 12, and a communication unit 13, which are connected with each other by a bus (not illustrated). The processing unit 11 is a processor represented by CPU, and executes a program stored in the storage unit 12 to implement various functions related to the management server 1. That is, information processing by software stored in the storage unit 12 is specifically implemented by the processing unit 11 which is an example of hardware, and can be thereby executed as each functional unit included in the processing unit 11. The storage unit 12 is, for example, a read only memory (ROM), a random access memory (RAM), a hard disk drive (HDD), or a solid state drive (SSD), and stores various types of data in addition to a program executed by the processing unit 11. The communication unit 13 is a communication interface with an external device.

The robot 2 includes a processing unit 21, a storage unit 22, a communication unit 23, an input unit 24, an output unit 25, a traveling unit 26, a sensor group 27, and an imaging unit 28. Since the processing unit 21, the storage unit 22, and the communication unit 23 can have similar configurations to the processing unit 11, the storage unit 12, and the communication unit 13 of the management server 1, respectively, description thereof will be omitted.

The input unit 24 receives various inputs. The input unit 24 may be, for example, various switch buttons that can be operated at the time of maintenance or the like, a microphone that receives voice input of the visitor 9, or an operation panel that receives an input or the like of reservation information by the visitor 9.

The output unit 25 outputs various types of information. The output unit 25 may be, for example, a speaker capable of outputting voice or a display unit such as a display capable of displaying an image. In the present embodiment, the face portion 205 functions as the output unit 25 that outputs (displays) an image.

The traveling unit 26 includes, for example, the above-described traveling device 204 that causes the robot 2 to self-travel. The traveling unit 26 includes, for example, a battery and an electric motor, and is configured such that the electric motor is driven by electric power supplied from the battery. The traveling unit 26 can be appropriately configured using a known electric technique.

The sensor group 27 can include various sensors, for example, a sensor that detects a traveling state and a stop state of the robot 2, such as a traveling speed sensor, an acceleration sensor, or a gyro sensor, and a sensor that detects a state around the robot 2, such as an obstacle sensor, a human detecting sensor, or a moving body sensor.

The imaging unit 28 is a camera having an imaging element such as a CCD or a CMOS, and is configured to be able to image a visitor who visits the showroom 5. The imaging unit 28 is disposed, for example, on the head portion 201 of the robot 2. According to such an arrangement mode, it is easy to image the face of the visitor 9. In addition, the imaging unit 28 may be disposed near the pair of pseudo eyes 206 of the robot 2 from a viewpoint of imaging the face of the visitor 9.

The terminal device 3 includes a processing unit 31, a storage unit 32, a communication unit 33, an input unit 34, and an output unit 35. Since the processing unit 31, the storage unit 32, and the communication unit 33 can have similar configurations to the processing unit 11, the storage unit 12, and the communication unit 13 of the management server 1, respectively, description thereof will be omitted.

The input unit 34 receives various inputs from the person in charge of response 8 and the like. The input unit 34 is, for example, a touch panel. The output unit 35 outputs various types of information. The output unit 35 may be, for example, a speaker capable of outputting voice or a display unit such as a display capable of displaying an image.

The camera unit 4 includes an imaging unit 41 and a communication unit 42. The imaging unit 41 is a camera having an imaging element such as a CCD or a CMOS, and is configured to be able to image a visitor who visits the showroom 5. The communication unit 42 is an interface with an external device, and transmits an image captured by the imaging unit 41 to the management server 1 via the network NW.

<Functional Configuration of Management Server 1>

FIG. 4 is a block diagram illustrating functions implemented by the management server 1. The processing unit 11 of the management server 1 functions as functional units 111 to 119 illustrated in FIG. 4.

An in-facility image acquiring unit 111 acquires images of the inside of the showroom 5 captured by the plurality of camera units 4 installed in the showroom 5. Specifically, to the in-facility image acquiring unit 111, image (including a still image and a moving image) data of the inside of the showroom 5 captured by the plurality of camera units 4 is input via the communication unit 13. For example, the in-facility image acquiring unit 111 outputs a control signal for causing the plurality of camera units 4 to image the showroom 5 via the communication unit 13, and to the in-facility image acquiring unit 111, in-showroom image data captured by the plurality of camera units 4 is input via the communication unit 13.

A robot image acquiring unit 112 acquires an image including a face image of the visitor 9 captured by the robot 2 disposed in the showroom 5. Specifically, to the robot image acquiring unit 112, image (including a still image and a moving image) data including a face image of the visitor 9 captured by the robot 2 is input via the communication unit 13. For example, the robot image acquiring unit 112 outputs a control signal for causing the robot 2 to image a face of the visitor 9 via the communication unit 13, and to the robot image acquiring unit 112, image data including a face image of the visitor 9 captured by the robot 2 is input via the communication unit 13.

A negotiation content acquiring unit 113 acquires the contents of a negotiation between the person in charge of response 8 and the visitor 9. For example, the negotiation content acquiring unit 113 acquires, via the communication unit 13, data related to the contents of a negotiation transmitted from the terminal device 3 to the management server 1. Examples of the data related to the contents of the negotiation include data related to contents displayed on a display unit as the output unit 35. For example, the negotiation content acquiring unit 113 acquires contents (new car catalog, estimation, and the like) displayed on a display unit of the terminal device 3 during a negotiation between the person in charge of response 8 and the visitor 9. As a result, the processing unit 11 can grasp the contents of the negotiation. Alternatively, the negotiation content acquiring unit 113 may acquire, from the robot 2, voice data of a conversation between the person in charge of response 8 and the visitor 9. Then, the negotiation content acquiring unit 113 may acquire the contents of the negotiation on the basis of the contents of the conversation. In addition, the negotiation content acquiring unit 113 also recognizes that the negotiation has started and that the negotiation has ended.

A visitor specifying unit 114 specifies the visitor 9 who has visited the showroom 5 from the image of the inside of the showroom acquired by the in-facility image acquiring unit 111. For example, the visitor specifying unit 114 extracts a person from the image of the inside of the showroom, and further extracts (recognizes) a face image from the extracted person. Then, the visitor specifying unit 114 searches for visitor data having a face image that coincides with the extracted face image from visitor data stored in a visitor DB 123, and specifies the visitor 9. If there is no visitor data having a face image that coincides with the extracted face image, the visitor specifying unit 114 causes the visitor DB 123 to store the extracted face image as the new visitor 9.

A reaction estimating unit 115 estimates a reaction of the visitor 9. For example, the reaction estimating unit 115 estimates a reaction of the visitor 9 on the basis of an image of the visitor 9 acquired by the robot image acquiring unit 112 during a negotiation between the person in charge of response 8 and the visitor 9. The reaction of the visitor 9 may be, for example, an emotion of the visitor 9 to a topic provided by the person in charge of response 8.

As a method for specifying an emotion, a known technique can be appropriately adopted. For example, the emotion of the visitor 9 can be estimated on the basis of action, behavior, and the like of the visitor 9. Specifically, the reaction estimating unit 115 may estimate the emotion of the visitor 9 from a face image of the visitor 9 extracted from the image of the inside of the showroom 5, a movement of the visitor 9, and the like. For example, the reaction estimating unit 115 estimates that the visitor 9 is in a bad mood when the visitor 9 looks angry or when the visitor 9 is restless, for example, looking around or acting restless. On the other hand, the reaction estimating unit 115 estimates that the visitor 9 is in a good mood when the visitor 9 looks happy, when the visitors 9 talks with each other, or the like.

A reaction information output unit 116 outputs reaction information. For example, the reaction information output unit 116 outputs reaction information, which is information regarding the reaction estimated by the reaction estimating unit 115, to the storage unit 12, and the storage unit 12 stores the reaction information in the visitor DB 123. In addition, for example, the reaction information output unit 116 outputs the reaction information to the robot 2 or the terminal device 3. The robot 2 or the terminal device 3 to which the reaction information has been input outputs the reaction information (for example, displays the reaction information on a screen), and the person in charge of response 8 can thereby grasp the reaction of the visitor 9 to the contents of the negotiation.

An action specifying unit 117 specifies an action of a staff member (person in charge of response 8) in the showroom 5. For example, the action specifying unit 117 may specify the action of the person in charge of response 8 on the basis of the position, traffic line, or the like of the person in charge of response 8 recognized on the basis of an image of the inside of the showroom 5 acquired by the in-facility image acquiring unit 111. As an example, if the person in charge of response 8 enters the negotiation space 52a together with the visitor 9, the action specifying unit 117 specifies that the person in charge of response 8 will start a negotiation. Alternatively, the action specifying unit 117 may receive, from the terminal device 3, data related to the contents of operation received by the terminal device 3 and specify the action of the person in charge of response 8 on the basis of the contents of the received data.

A robot movement instructing unit 118 instructs the robot 2 to move. For example, when the robot movement instructing unit 118 detects that the visitor 9 has entered a store from the entrance 51 on the basis of an image acquired by the in-facility image acquiring unit 111, the robot movement instructing unit 118 moves the robot 2 to the vicinity of the entrance 51. In addition, for example, if the action specifying unit 117 specifies that a negotiation between the person in charge of response 8 and the visitor 9 will start, the robot movement instructing unit 118 moves the robot 2 to the negotiation space 52.

Note that at least some of the functions implemented by the processing unit 11 of the management server 1 may be implemented by hardware. For example, at least some of the functions implemented by the processing unit 11 may be implemented by a known semiconductor device such as a programmable logic device (PLD) or an application specific integrated circuit (ASIC). In addition, here, the processing unit 11 is described as a single element, but the processing unit 11 may be divided into two or more elements as necessary.

Note that the same applies to the processing unit 21 of the robot 2 and the processing unit 31 of the terminal device 3, and at least some of functions implemented by the processing unit 21 and the processing unit 31 may be implemented by hardware. In addition, each of the processing unit 21 and the storage unit 22 may be divided into two or more elements as necessary.

Next, a database constructed by the storage unit 12 of the management server 1 will be described. In the present embodiment, the storage unit 12 constructs a robot database (DB) 121, a showroom database (DB) 122, a visitor database (DB) 123, and a negotiation content database (DB) 124.

The robot DB 121 manages basic information, maintenance information, or the like regarding the robot 2, such as the ID of the robot 2. The showroom DB 122 stores data corresponding to arrangement of a display car 53 and other articles disposed in the showroom 5, data related to a use reservation of the negotiation space 52, and the like.

The visitor DB 123 stores visitor information of the visitor 9 who visits the showroom 5. The visitor information includes a face image, a visit history, and the like of the visitor 9 in addition to basic information of the visitor such as an address, a name, an age, an occupation, and a gender of the visitor. The visit history may include a chat before a negotiation and the like in addition to the contents of a negotiation at the time of visit. In addition, in the present embodiment, the visitor information includes a visit reservation to the showroom 5. The visit reservation includes reservation date and time, information on the person in charge of response 8 on the showroom 5 side, and the like.

<Processing Example>
<Output of Reaction Information>

FIG. 5 is a flowchart illustrating a processing example of the processing unit 11. FIG. 5 illustrates processing when the processing unit 11 specifies a reaction of the visitor 9 and outputs information regarding the reaction during a negotiation between the person in charge of response 8 and the visitor 9. This flowchart is implemented when the processing unit 11 reads and executes a program stored in the storage unit 12 to function as the functional units illustrated in FIG. 4.

This flowchart is repeatedly executed at a predetermined cycle on the basis of start of a negotiation between the person in charge of response 8 and the visitor 9. For example, in the negotiation space 52a, when the person in charge of response 8 performs an input indicating that a negotiation will start to the terminal device 3, information indicating that the negotiation will start is transmitted from the terminal device 3 to the management server 1. The processing unit 11 starts the flowchart of FIG. 5 on the basis of reception of the information indicating that the negotiation will start via the communication unit 13.

S1 is a conditional branch on whether or not the negotiation is continuing. The negotiation content acquiring unit 113 proceeds to S2 if the negotiation is continuing, and proceeds to S5 if the negotiation has ended. For example, when the negotiation has ended, the person in charge of response 8 performs an input indicating that the negotiation has ended via the input unit 34. Then, the processing unit 31 transmits information indicating that the negotiation has ended to the management server 1 via the communication unit 33. When the negotiation content acquiring unit 113 receives information indicating that the negotiation has ended from the terminal device 3 via the communication unit 13, the negotiation content acquiring unit 113 determines that the negotiation has ended. Alternatively, the negotiation content acquiring unit 113 may determine whether the negotiation is continuing or has ended by acquiring voice data regarding a conversation between the person in charge of response 8 and the visitor 9 from the robot 2b and analyzing the contents of the conversation.

In S2, the negotiation content acquiring unit 113 acquires a topic of the negotiation. More specifically, the negotiation content acquiring unit 113 acquires information regarding a topic provided by the person in charge of response 8 in the negotiation between the visitor 9 and the person in charge of response 8.

Specifically, the negotiation content acquiring unit 113 acquires information regarding a topic provided by the person in charge of response 8 on the basis of the contents of operation of the terminal device 3 operated by the person in charge of response 8. For example, it is assumed that the person in charge of response 8 operates the terminal device 3 to cause a display unit of the terminal device 3 to display a catalog of a new car A. In this case, the terminal device 3 transmits, to the management server 1, data with which it can be recognized that the catalog of the new car A is displayed. The negotiation content acquiring unit 113 recognizes that the topic of the negotiation is introduction of the new car A on the basis of the received data.

In addition, specifically, the negotiation content acquiring unit 113 acquires information regarding a topic provided by the person in charge of response 8 on the basis of a detection result of voice of the person in charge of response 8 by the robot 2. The negotiation content acquiring unit 113 acquires voice data of a conversation during the negotiation from the robot 2. Then, the negotiation content acquiring unit 113 generates text data from the acquired voice data and recognizes the contents of the negotiation on the basis of the contents of the generated text data. For example, the negotiation content acquiring unit 113 may extract a specific term (car name such as "new car A", "estimation", "delivery date", and the like) registered in advance from a text and recognize the contents of the negotiation on the basis of the extraction result.

FIG. 6A is a diagram illustrating information acquired by the negotiation content acquiring unit 113. For example, the negotiation content acquiring unit 113 acquires information in which the acquired contents of the topic are associated with the time and the name (or identification information or the like) of the visitor 9. In the present embodiment, the negotiation content acquiring unit 113 may store information regarding the acquired contents of the topic in a temporary storage area such as a RAM included in the storage unit 12.

In S3, the robot image acquiring unit 112 acquires a detection result regarding speech and behavior of the visitor 9 by the robot 2. For example, the robot image acquiring unit 112 outputs a control signal for causing the robot 2 to image a face of the visitor 9 via the communication unit 13, and to the robot image acquiring unit 112, image data including a face image of the visitor 9 captured by the imaging unit 28 of the robot 2 is input via the communication unit 13. Note that, here, image data captured by the imaging unit 28 of the robot 2 is acquired as a detection result regarding speech and behavior of the visitor 9, but for example, voice data of the visitor 9 detected by a microphone as the input unit 24 of the robot 2 may be acquired.

In S4, the reaction estimating unit 115 estimates (acquires) a reaction of the visitor 9 on the basis of the detection result acquired in S3. As described above with reference to FIG. 4, the reaction estimating unit 115 estimates the reaction of the visitor 9 on the basis of the image data as the acquired detection result. In the present embodiment, the reaction estimating unit 115 determines whether an emotion of the visitor 9 is neutral, positive, or negative.

FIG. 6B is a diagram illustrating information acquired by the reaction estimating unit 115. For example, the reaction estimating unit 115 acquires information in which an estimation result of the emotion of the visitor 9 is associated with the time and the name (or identification information or the like) of the visitor 9. In the present embodiment, the reaction estimating unit 115 stores the acquired information in a temporary storage area such as a RAM included in the storage unit 12.

In S5, the reaction information output unit 116 outputs information regarding the reaction of the visitor 9 estimated by the reaction estimating unit 115 in S4. In the present embodiment, the reaction information output unit 116 outputs information regarding the reaction of the visitor 9 to the storage unit 12. That is, the reaction information output unit 116 causes the visitor DB 123 of the storage unit 12 to store information regarding the reaction of the visitor 9. In the present embodiment, the reaction information output unit 116 causes the visitor DB 123 to store information regarding the topic of the negotiation acquired in S2 and information regarding the result of detection by the robot 2 acquired in S4 in association with each other.

FIG. 6C is a diagram illustrating information output from the reaction information output unit 116 to the visitor DB 123. The reaction information output unit 116 outputs information stored in the temporary storage area in S2 and information stored in the temporary storage area in S4 to the visitor DB 123 in association with each other. Specifically, the reaction information output unit 116 causes the visitor DB 123 to store information in which the topic of the negotiation acquired in S2 is associated with the reaction of the visitor 9 to the topic. The association at this time may be performed on the basis of the time included in each piece of information. For example, the reaction information output unit 116 recognizes that the topic between 13:00 to 13:15 is introduction of the new car A from the information acquired in S2. In addition, in S4, the reaction information output unit 116 recognizes that the estimation result of the emotion of the visitor 9 during 13:00 to 13:15 includes one neutral emotion, one positive emotion, and one negative emotion. On the basis of the three estimation results in total, the reaction information output unit 116 may associate the reaction (emotion) of the visitor 9 to the topic "introduction of new car A" with "neutral" in total.

Note that, in the present processing example, information regarding the reaction of the visitor 9 is output by the reaction information output unit 116 after the negotiation is ended, but information acquired in the processing may be output to the visitor DB 123 as needed and registered.

<Display Instruction to Terminal Device 3>

Figure 7:
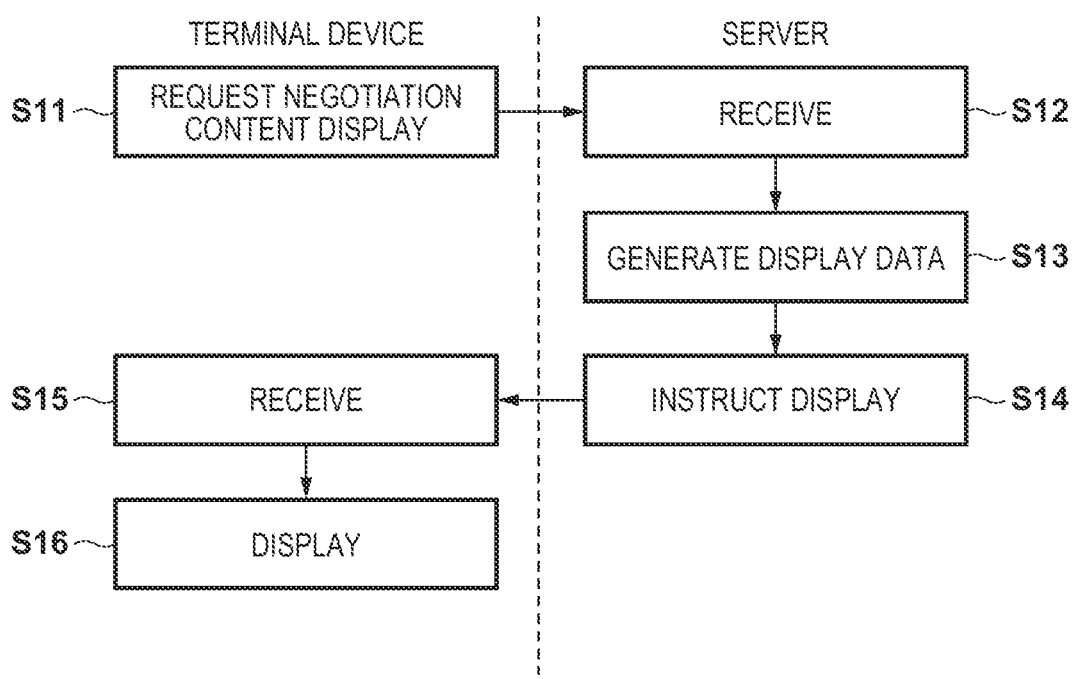
FIG. 7 is a flowchart illustrating processing examples of a processing unit of a management server and a processing unit of a terminal device.

FIG. 7 is a flowchart illustrating processing examples of the processing unit 11 of the management server 1 and the processing unit 31 of the terminal device 3. FIG. 7 illustrates processing examples of the processing unit 11 and the processing unit 31 in a case where reaction information is displayed on the terminal device 3 as one mode of output of the reaction information by the reaction information output unit 116.

In S11, the processing unit 31 transmits a negotiation content display request to the management server 1 via the communication unit 33. This request is a request for causing a display unit as the output unit 35 of the terminal device 3 to display the contents of the negotiation after or during the negotiation.

In S12, the processing unit 11 receives the negotiation content display request from the processing unit 31 via the communication unit 13. Thereafter, in S13, the reaction information output unit 116 of the processing unit 11 generates display data for causing the display unit as the output unit 35 to display the contents of the negotiation. The reaction information output unit 116 generates this display data on the basis of data illustrated in FIG. 6C stored in the visitor DB 123. That is, the display data is data in which information regarding the topic of the negotiation is associated with information regarding the reaction of the visitor 9 to the topic. In S14, the reaction information output unit 116 transmits an instruction to display the contents of the negotiation to the terminal device 3 via the communication unit 13. The display instruction here may include display data generated in S13 in addition to a command to cause the display unit as the output unit 35 to display a screen regarding the contents of the negotiation.

In step S15, the processing unit 31 receives the display instruction transmitted from the processing unit 11 via the communication unit 33. In S16, the processing unit 31 causes the display unit as the output unit 35 to display the contents of the negotiation on the basis of the display data received in S15. FIG. 8 is a diagram illustrating a screen example 35a displayed on the display unit as the output unit 35 of the terminal device 3. The screen example 35a displays an outline of an interview (date and time, customer name, and name of person in charge), a reaction of the customer to a topic of a negotiation, and a comment. As described above, the reaction of the visitor 9 to the topic of the negotiation, a comment prompting a response corresponding to the reaction, and the like are displayed on the terminal device 3. As a result, the person in charge of response 8 can recognize the reaction of the visitor 9 with higher accuracy, and can provide customer service according to the reaction of the visitor 9.

<Instruction to Move Robot>

FIG. 9A is a flowchart illustrating a processing example of the processing unit 11. FIG. 9A illustrates a processing example of the processing unit 11 when the management server 1 gives an instruction to move the robot 2 to a negotiation place. For example, this flowchart is repeatedly executed at a predetermined cycle during business hours of a store including the showroom 5.

In S111, the in-facility image acquiring unit 111 acquires images of the inside of the showroom 5 captured by the plurality of camera units 4 installed in the showroom 5. In S112, the action specifying unit 117 performs action recognition processing of the person in charge of response 8 on the basis of the image acquired in S111.

FIG. 9B is a flowchart illustrating a specific example of the action recognition processing in S112.

S1121 is a conditional branch based on movement of the person in charge of response 8. The action specifying unit 117 proceeds to S1122 if the person in charge of response 8 is moving to a negotiation room, and otherwise, the action specifying unit 117 ends the flowchart of FIG. 9B and returns to the flowchart of FIG. 9A. For example, if the camera unit 4 disposed in the negotiation space 52 can specify the person in charge of response 8, the action specifying unit 117 may determine that the person in charge of response 8 is moving to a negotiation room. Alternatively, if the action specifying unit 117 can recognize that the person in charge of response 8 is approaching the negotiation space 52 on the basis of data of a moving image or a plurality of still images acquired in time series, acquired by the camera unit 4, the action specifying unit 117 may determine that the person in charge of response 8 is moving to a negotiation room.

S1122 is conditional branch based on a reservation status of the negotiation. If there is a reservation for a negotiation for which the target person in charge of response 8 is in charge, the action specifying unit 117 proceeds to S1123 and recognizes that the person in charge of response 8 will perform the negotiation, and otherwise, the action specifying unit 117 ends the flowchart of FIG. 9B and returns to the flowchart of FIG. 9A. For example, the action specifying unit 117 confirms a negotiation reservation of the person in charge of response 8 stored in the visitor DB 123. If there is a negotiation reservation of the person in charge of response 8 within a predetermined time before and after the current time, the action specifying unit 117 proceeds to S1123. As described above, the action specifying unit 117 may recognize the action of the person in charge of response 8 on the basis of visit reservation information of the visitor 9.

S113 is conditional branch based on the recognition result in S112. If the action specifying unit 117 recognizes that the person in charge of response 8 will perform a negotiation in S112, the action specifying unit 117 proceeds to S114, and otherwise, the action specifying unit 117 ends the flowchart.

In S114, the robot movement instructing unit 118 instructs the robot 2 to move. The robot movement instructing unit 118 instructs the robot 2 to move to the negotiation space 52 where the person in charge of response 8 performs a negotiation. At this time, the robot movement instructing unit 118 may instruct a robot 2 that is not responding to another negotiation or reception to move among the robots 2 disposed in the showroom 5. Specifically, the robot DB 121 may store the current status of the robot 2 such as being responding to reception, being responding to a negotiation, or standby. Then, the robot movement instructing unit 118 may instruct a robot 2 whose status is standby to move on the basis of the status of each robot 2 stored in the robot DB 121. Alternatively, the robot movement instructing unit 118 may instruct a robot 2 that has responded to reception of the visitor 9 to perform a negotiation to move to the negotiation space 52 also for guiding the visitor 9 to the negotiation space 52.

As described above, by moving the robot 2 to a negotiation place according to the action of the person in charge of response 8, the robot 2 can attend a negotiation. As a result, the robot 2 attending the negotiation can acquire information regarding a reaction of the visitor 9.

As described above, according to the present embodiment, information regarding the reaction of the visitor 9 estimated by the reaction estimating unit 115 is output by the reaction information output unit 116. Therefore, the person in charge of response 8 can provide appropriate customer service according to the reaction of the visitor 9 using the output information. In addition, in the present embodiment, information in which a topic of a negotiation is associated with the reaction of the visitor 9 to the topic is output. Therefore, the person in charge of response 8 can provide more appropriate customer service on the basis of the reaction of the visitor 9 to the contents of the negotiation.

Second Embodiment

Next, a second embodiment will be described. As an outline, the second embodiment is different from the first embodiment in a mode in which information regarding a reaction of a visitor 9 is output during a negotiation. Hereinafter, similar configurations to those in the first embodiment are denoted by similar reference numerals, and description thereof will be omitted.

FIG. 10 is a flowchart illustrating processing examples of a processing unit 11 of a management server 1 and a processing unit 21 of a robot 2. This flowchart illustrates processing when the robot 2 appropriately outputs the reaction of the visitor 9 during a negotiation between a person in charge of response 8 and the visitor 9. That is, this flowchart is repeatedly executed at a predetermined cycle while the negotiation between the person in charge of response 8 and the visitor 9 is being performed.

In S211, a negotiation content acquiring unit 113 receives (acquires) information transmitted from a terminal device 3. In S212, a robot image acquiring unit 112 requests an image of the visitor 9 captured by the robot 2 as speech and behavior information of the visitor 9. Note that the processing unit 11 may request voice data of the visitor 9 as the speech and behavior information of the visitor 9.

In S221, the processing unit 21 receives a request from the management server 1. In S222, the processing unit 21 transmits a detection result of the speech and behavior information to the management server 1 via a communication unit 23. In the present embodiment, the detection result of the speech and behavior information is image data of an image of the visitor 9 captured by an imaging unit 28.

In S213, the negotiation content acquiring unit 113 receives the information transmitted from the robot 2 in S222 via a communication unit 13. Note that steps S212 and S213 may be steps similar to S3 in FIG. 5.

In S214, the reaction estimating unit 115 estimates (acquires) the reaction of the visitor 9 on the basis of the information acquired in S213. This step may be a step similar to S4 in FIG. 5. Thereafter, in S215, as an output of reaction information regarding the reaction acquired in S214, a reaction information output unit 116 instructs the robot 2 to display the reaction information via the communication unit 13. For example, the reaction information output unit 116 transmits, to the robot 2, information indicating whether a current emotion of the visitor 9 is neutral, positive, or negative together with the display instruction.

In S223, the processing unit 21 receives the display instruction transmitted from the management server 1 in S215 via the communication unit 23. In S224, the processing unit 21 performs display based on the received display instruction. Specifically, the processing unit 21 causes a face portion 205 that functions as an output unit 25 of the robot 2 to perform display corresponding to the emotion of the visitor 9.

Figure 11A:
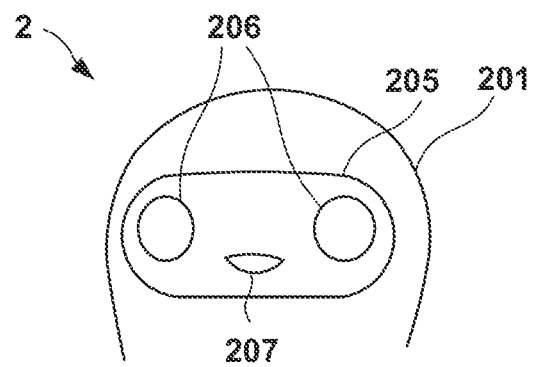
FIG. 11A is a diagram illustrating a display example of a face portion of a robot.
Figure 11B:
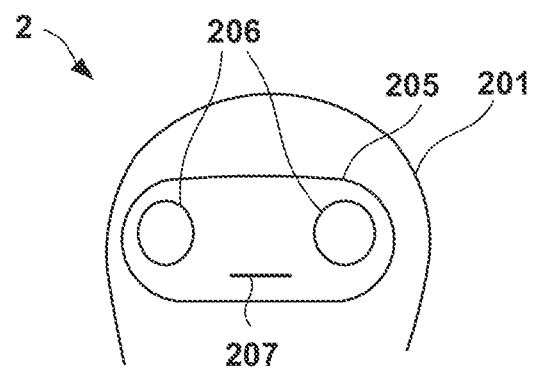
FIG. 11B is a diagram illustrating a display example of a face portion of a robot.
Figure 11C:
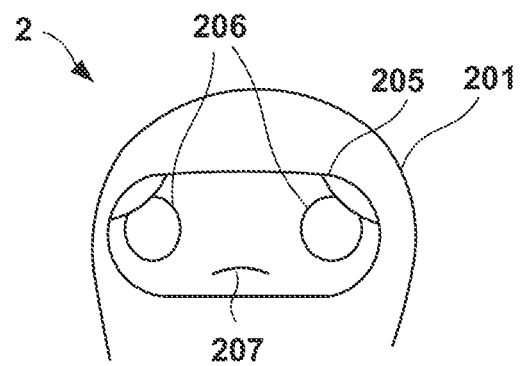
FIG. 11C is a diagram illustrating a display example of a face portion of a robot.

FIGS. 11A to 11C are diagrams illustrating display examples of the face portion 205 of the robot 2. FIG. 11A illustrates a display example in a case where the emotion of the visitor 9 estimated in S214 is positive. FIG. 11B illustrates a display example in a case where the emotion of the visitor 9 estimated in S214 is neutral. FIG. 11C illustrates a display example in a case where the emotion of the visitor 9 estimated in S214 is negative. In this way, by setting the expression of the robot 2 to an expression that coincides with the emotion of the visitor 9, the person in charge of response 8 can more intuitively grasp the reaction of the visitor 9.

As described above, according to the present embodiment, the person in charge of response 8 can confirm the reaction of the visitor 9 during a negotiation. Therefore, the person in charge of response 8 can provide more appropriate customer service on the basis of the reaction of the visitor 9 to the contents of the negotiation. Note that, in the present embodiment, information regarding the reaction of the visitor 9 is not associated with information regarding a topic of a negotiation, but since the person in charge of response 8 can confirm the reaction of the visitor 9 in real time, the person in charge of response 8 can grasp the reaction of the visitor 9 to the contents of the topic.

Note that the configurations of the first embodiment and the second embodiment can be appropriately combined with each other.

Other Embodiments

In the description of the above embodiments, an example in a case where the customer service system SY is used in the showroom 5 of an automobile dealer has been described. However, the customer service system SY can be used in, for example, a business entity such as a store that retails various products, an art-related facility such as an art museum, a museum, an art gallery, or a gallery, a science museum, a memorial house, an exhibition, or a workshop. Examples of the store that retails various products include a department store, a supermarket, and a specialized store.

In addition, in the customer service system SY, a function performed by each device may be appropriately changed. For example, the robot 2 may execute a part of processing of the management server 1. As an example, the processing unit 21 of the robot 2 may execute estimation processing of the reaction of the visitor 9 illustrated in S4 of FIG. 5. In this case, the processing unit 21 may estimate the reaction of the visitor 9 on the basis of a captured image of the visitor 9 in response to a request of the processing unit 11 for information regarding the reaction of the visitor 9 to the processing unit 21.

In addition, the processing unit 21 may acquire, from the robot 2, voice data during a negotiation detected by a microphone as the input unit 24 of the robot 2, and generate text data on the basis of the acquired voice data. That is, the processing unit 21 may perform transcription of voice during a negotiation. Then, the processing unit 21 may store the generated text data as a visit record in the visitor DB 123. Since this text data is stored, for example, when the person in charge of response 8 wants to look back in detail on a topic on which the reaction of the visitor 9 was not good, the person in charge of response 8 can refer to the specific contents of a conversation.

Summary of Embodiments

The above embodiments disclose at least the following customer service system, server, control method, and program.

1. A customer service system in the above embodiment is,
a customer service system (SY) for providing customer service using a robot for customer service, the customer service system comprising:
a first acquisition unit (11, S2) configured to acquire first information regarding a topic provided by a person in charge of response in a negotiation between a visitor and the person in charge of response;
a second acquisition unit (11, S3) configured to acquire a detection result regarding speech and behavior of the visitor by the robot;
an estimation unit (11, S4) configured to estimate a reaction of the visitor on a basis of the detection result acquired by the second acquisition unit; and
an output unit (11, S5) configured to output second information regarding the reaction estimated by the estimation unit.

According to the embodiments, an output unit outputs information regarding a reaction of a visitor estimated by an estimation unit. Therefore, a person in charge of response can provide appropriate customer service according to the reaction of the visitor using the information output by the output unit.

2. According to the above embodiments, the second information is information regarding an emotion of the visitor.

According to the embodiments, it is possible to provide customer service according to an emotion of a visitor.

3. According to the above embodiments, the first acquisition unit acquires the first information on a basis of contents of operation of a terminal device operated by the person in charge of response.

According to the embodiments, it is possible to recognize the contents of a negotiation by the contents of operation of a terminal device by a person in charge of response.

4. According to the above embodiments, the first acquisition unit acquires the first information on a basis of a detection result of voice of the person in charge of response by the robot.

According to the embodiments, a person in charge of response can recognize the contents of a negotiation without performing specific processing such as operation of a terminal device.

5. According to the above embodiments, the output unit outputs the first information and the second information to a storage unit in association with each other.

According to the embodiments, since information in which first information and second information are associated with each other is available, it is possible to provide more appropriate customer service on the basis of a response of a visitor to the contents of a negotiation.

6. According to the above embodiments, the output unit outputs the second information to the robot.

According to the embodiments, a person in charge of response can confirm a reaction of a visitor via a robot.

7. According to the above embodiments, the output unit outputs the first information and the second information to a terminal device operated by the person in charge of response in association with each other.

According to the embodiments, a person in charge of response can confirm a reaction of a visitor to the contents of a negotiation with a terminal device.

8. According to the above embodiments, the customer service system further comprises a recognition unit (11, S112) configured to recognize an action of the person in charge of response; and an instruction unit (11, S114) configured to move the robot to a place where the negotiation is performed.

According to the embodiments, since a robot moves to a place where a negotiation is performed, information regarding a reaction of a visitor during the negotiation can be acquired by the robot.

9. According to the above embodiments, the customer service system further comprises a management unit (123) configured to manage visit reservation information of the visitor, wherein the recognition unit recognizes the action on a basis of the visit reservation information.

According to the embodiments, a recognition unit can recognize an action of a person in charge of response with higher accuracy.

10. According to the above embodiments, a generation unit configured to generate text data on a basis of voice data of a conversation between the visitor and the person in charge of response in the negotiation.

According to the embodiments, since a person in charge of response can confirm the contents of a conversation during a negotiation with a text, the person in charge of response can efficiently confirm the contents of the negotiation.

11. According to the above embodiments, a server (1) functions as each unit of the customer service system according to the above embodiments.

According to the embodiments, a server for providing more appropriate customer service is provided on the basis of a reaction of a visitor to the contents of a negotiation.

12. A control method in the above embodiments is,
a control method of a customer service system for providing customer service using a robot for customer service, the customer service method comprising:
acquiring (S2) first information regarding a topic provided by a person in charge of response in a negotiation between a visitor and the person in charge of response;
acquiring (S3) a detection result regarding speech and behavior of the visitor by the robot;
estimating (S4) a reaction of the visitor on a basis of the detection result acquired in the acquiring the detection result; and
outputting (S5) second information regarding the reaction estimated in the estimating.

According to the embodiments, a person in charge of response can provide appropriate customer service according to a reaction of a visitor using information output in an output step.

13. An storage medium in the above embodiments is,
an non-transitory storage medium that stores a program causing a computer to execute a customer service method, the method comprising:
acquiring (S2) first information regarding a topic provided by a person in charge of response in a negotiation between a visitor and the person in charge of response;
acquiring (S3) a detection result regarding speech and behavior of the visitor by the robot;
estimating (S4) a reaction of the visitor on a basis of the detection result acquired in the acquiring the detection result; and
outputting (S5) second information regarding the reaction estimated in the estimating.

According to the embodiments, a person in charge of response can provide appropriate customer service according to a reaction of a visitor using information output by an output unit.

The invention is not limited to the foregoing embodiments, and various variations/changes are possible within the spirit of the invention.

What is claimed is:

1. A customer service system for providing customer service using a robot for customer service, the customer service system comprising: a first camera, the robot and a server, wherein the first camera acquires an image of a person in charge of response, the robot comprises a second camera, a display device and a traveling device to move the robot, the server comprises a circuit including a processor and a storage device and configured to execute:

recognizing an action of a person in charge of response based on the image of person in charge of response acquired by the first camera;

instructing the robot to move to a place where a negotiation is performed, the robot moving to the place where the negotiation is performed by using the traveling device based on the instruction;

acquiring information regarding a topic provided by the person in charge of response in the negotiation between a visitor and the person in charge of response;

acquiring a detection result regarding speech and behavior of the visitor by the robot, the detection result including an image data acquired by the second camera of the robot;

estimating an emotion of the visitor on a basis of the detection result acquired; and outputting a display instruction which instructs to perform display indicating the emotion estimated to the robot, the robot performing display according to the display instruction by using the display device.

2. The customer service system according to claim 1, wherein
the information is acquired on a basis of contents of operation of a terminal device operated by the person in charge of response.

3. The customer service system according to claim 1, wherein
the information is acquired on a basis of a detection result of voice of the person in charge of response by the robot.

4. The customer service system according to claim 1, wherein the circuit is configured to execute
managing visit reservation information of the visitor, and
wherein in the recognizing, the action is recognized on a basis of the visit reservation information.

5. The customer service system according to claim 1, wherein the circuit is configured to execute
generating text data on a basis of voice data of a conversation between the visitor and the person in charge of response in the negotiation.

6. A server of a customer service system for providing customer service using a robot for customer service, the customer service system comprising: a first camera, the robot and the server, wherein
the first camera acquires an image of a person in charge of response,
the robot comprises a second camera, a display device and a traveling device to move the robot,
the server comprises:
at least one processor configured to perform:
recognizing an action of a person in charge of response based on the image of person in charge of response acquired by the first camera;
instructing a robot for customer service to move to a place where a negotiation is performed, the robot moving to the place where the negotiation is performed by using the traveling device based on the instruction;
acquiring information regarding a topic provided by the person in charge of response in the negotiation between a visitor and the person in charge of response;
acquiring a detection result regarding speech and behavior of the visitor by the robot, the detection result including an image data acquired by the second camera of the robot;
estimating an emotion of the visitor on a basis of the detection result acquired in the acquiring the detection result; and
outputting a display instruction which instructs to perform display indicating the emotion estimated to the robot, the robot performing display according to the display instruction by using the display device.

7. A control method of a customer service system for providing customer service using a robot for customer service, the robot comprising a second camera, a display device and a traveling device to move the robot, the customer service method comprising:
recognizing an action of a person in charge of response based on an image of person in charge of response acquired by a first camera;
instructing the robot to move to a place where a negotiation is performed, the robot moving to the place where the negotiation is performed by using the traveling device based on the instruction;
acquiring information regarding a topic provided by the person in charge of response in the negotiation between a visitor and the person in charge of response;
acquiring a detection result regarding speech and behavior of the visitor by the robot, the detection result including an image data acquired by the second camera of the robot;
estimating an emotion the visitor on a basis of the detection result acquired in the acquiring the detection result; and
outputting a display instruction which instructs to perform display indicating the emotion estimated to the robot, the robot performing display according to the display instruction by using the display device.

8. A non-transitory storage medium that stores a program causing a computer to execute a customer service method of a customer service system for providing customer service using a robot for customer service, the robot comprising a second camera, a display device and a traveling device to move the robot, the method comprising:
recognizing an action of a person in charge of response based on an image of person in charge of response acquired by a first camera;
instructing a robot for customer service to move to a place where a negotiation is performed, the robot moving to the place where the negotiation is performed by using the traveling device based on the instruction;
acquiring information regarding a topic provided by the person in charge of response in the negotiation between a visitor and the person in charge of response;
acquiring a detection result regarding speech and behavior of the visitor by the robot, the detection result including an image data acquired by the second camera of the robot;
estimating an emotion of the visitor on a basis of the detection result acquired in the acquiring the detection result; and
outputting a display instruction which instructs to perform display indicating the emotion estimated to the robot, the robot performing display according to the display instruction by using the display device.

* * * * *